US012609320B2

(12) United States Patent
Ai et al.

(10) Patent No.: US 12,609,320 B2
(45) Date of Patent: Apr. 21, 2026

(54) NEGATIVE ELECTRODE SHEET AND PREPARATION METHOD THEREFOR, SECONDARY BATTERY, AND ELECTRIC DEVICE

(71) Applicant: CONTEMPORARY AMPEREX TECHNOLOGY CO., LIMITED, Ningde (CN)

(72) Inventors: Yuquan Ai, Ningde (CN); Chengfeng Li, Ningde (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 0 days.

(21) Appl. No.: 19/327,004

(22) Filed: Sep. 12, 2025

(65) Prior Publication Data

US 2026/0011734 A1 Jan. 8, 2026

Related U.S. Application Data

(63) Continuation of application No. PCT/CN2023/141050, filed on Dec. 22, 2023.

(30) Foreign Application Priority Data

Jun. 12, 2023 (CN) ........................ 202310691530.4

(51) Int. Cl.
*H01M 4/62* (2006.01)
*H01M 4/04* (2006.01)
(Continued)

(52) U.S. Cl.
CPC ........... *H01M 4/62* (2013.01); *H01M 4/0426* (2013.01); *H01M 4/131* (2013.01); *H01M 4/133* (2013.01);
(Continued)

(58) Field of Classification Search
CPC ...... H01M 4/62; H01M 4/0426; H01M 4/131; H01M 4/133; H01M 4/134; H01M 4/1391;
(Continued)

(56) References Cited

U.S. PATENT DOCUMENTS

2012/0202112 A1* 8/2012 Yushin .................. H01M 4/463 429/246
2013/0330622 A1* 12/2013 Sasaki ................. H01M 4/1395 252/182.1
(Continued)

FOREIGN PATENT DOCUMENTS

CN 103035880 A 4/2013
CN 105514394 B 9/2017
(Continued)

OTHER PUBLICATIONS

State Intellectual Property Office of China Notice of the Granting of a Patent Right for an Invention for Application No. 202310691530.4 Nov. 4, 2025 6 pages (including translation).
(Continued)

*Primary Examiner* — Lisa S Park
(74) *Attorney, Agent, or Firm* — ANOVA LAW GROUP, PLLC

(57) ABSTRACT

A positive electrode sheet and a preparation method therefor, a secondary battery, and an electric device. The negative electrode sheet includes a negative electrode current collector, an active material layer, and a passivation layer, where the active material layer is provided between the negative electrode current collector and the passivation layer; the active material layer includes a negative electrode active material, the passivation layer includes ion resin, and the ion resin includes one or more of carboxymethyl cellulose and a metal salt of carboxymethyl cellulose.

19 Claims, 2 Drawing Sheets

(51) Int. Cl.

| | |
|---|---|
| ***H01M 4/131*** | (2010.01) |
| ***H01M 4/133*** | (2010.01) |
| ***H01M 4/134*** | (2010.01) |
| ***H01M 4/1391*** | (2010.01) |
| ***H01M 4/1393*** | (2010.01) |
| ***H01M 4/1395*** | (2010.01) |
| ***H01M 4/38*** | (2006.01) |
| ***H01M 4/485*** | (2010.01) |
| ***H01M 4/587*** | (2010.01) |
| ***H01M 10/42*** | (2006.01) |
| *H01M 4/02* | (2006.01) |
| *H01M 10/0525* | (2010.01) |

(52) U.S. Cl.
CPC ......... *H01M 4/134* (2013.01); *H01M 4/1391* (2013.01); *H01M 4/1393* (2013.01); *H01M 4/1395* (2013.01); *H01M 4/386* (2013.01); *H01M 4/387* (2013.01); *H01M 4/485* (2013.01); *H01M 4/587* (2013.01); *H01M 10/4235* (2013.01); *H01M 2004/021* (2013.01); *H01M 2004/027* (2013.01); *H01M 10/0525* (2013.01)

(58) Field of Classification Search
CPC .. H01M 4/1393; H01M 4/1395; H01M 4/386; H01M 4/387; H01M 4/485; H01M 4/587; H01M 10/4235; H01M 10/0525; H01M 2004/021; H01M 2004/027
See application file for complete search history.

(56) References Cited

U.S. PATENT DOCUMENTS

2015/0340697 A1* 11/2015 Jang ...................... H01M 4/134 429/188
2016/0149212 A1* 5/2016 Zaghib .................. H01M 4/666 429/231.95
2016/0336625 A1* 11/2016 Jeong .................. H01M 50/494
2019/0067685 A1* 2/2019 Zhu ...................... H01M 4/366
2019/0074520 A1* 3/2019 Woo ........................ H01M 4/62
2021/0143440 A1 5/2021 Liu et al.

FOREIGN PATENT DOCUMENTS

CN 108155363 * 6/2018
CN 111900357 A 11/2020
CN 113224297 A 8/2021
CN 113678295 A 11/2021
CN 115832640 A 3/2023
KR 20170099375 A 8/2017
KR 20180039898 * 4/2018

OTHER PUBLICATIONS

The World Intellectual Property Organization (WIPO) International Search Report for PCT/CN2023/141050 Mar. 12, 2024 6 Pages (including translation).

* cited by examiner

NEGATIVE ELECTRODE SHEET AND PREPARATION METHOD THEREFOR, SECONDARY BATTERY, AND ELECTRIC DEVICE

CROSS-REFERENCE TO RELATED APPLICATIONS

The present application is a continuation of International Application No. PCT/CN2023/141050, filed on Dec. 22, 2023, which claims priority to Chinese Patent Application No. 202310691530.4 filed to China Patent Office on Jun. 12, 2023, entitled "NEGATIVE ELECTRODE SHEET AND PREPARATION METHOD THEREFOR, SECONDARY BATTERY, AND ELECTRIC DEVICE", the entire disclosures of which are incorporated herein by reference.

TECHNICAL FIELD

The present application relates to the technical field of secondary batteries, and in particular, to a negative electrode sheet and a preparation method therefor, a secondary battery, and an electric device.

BACKGROUND

A lithium-ion battery is widely used in various large-scale power devices, energy storage systems, and various consumer products due to its advantages such as a high working voltage, a large energy density, no memory effect, and environmental friendliness, and is particularly widely used in the field of new energy vehicles such as a pure electric vehicle and a hybrid electric vehicle.

With wide application and continuous development of the lithium-ion battery, the safety of the lithium-ion battery attracts increasingly more attention. After a plurality of cycles of the lithium-ion battery, there is metal lithium plating on the surface of a negative electrode, and a metal lithium dendrite may cause a great safety risk.

Therefore, seeking for a lithium-ion battery having excellent cycle performance is one of directions on which those skilled in the art focus.

SUMMARY

The present application has been carried out in view of the above problem, and the objective thereof includes providing a negative electrode sheet and a preparation method therefor, a secondary battery, and an electric device.

In order to achieve the above objective, according to a first aspect of the present application, there is provided a negative electrode sheet, including a negative electrode current collector, an active material layer, and a passivation layer, where the active material layer is provided between the negative electrode current collector and the passivation layer;

the active material layer includes a negative electrode active material, the passivation layer includes ion resin, and the ion resin includes one or more of carboxymethyl cellulose and a metal salt of carboxymethyl cellulose.

For the negative electrode sheet provided by the present application, the active material layer and the passivation layer are provided on the current collector, the passivation layer includes the ion resin, and cations exchangeable with lithium ions are present in the ion resin, thereby effectively driving rapid migration and uniform distribution of the lithium ions. Moreover, the ion resin further includes a large number of hydrogen bonds cross-linkable into a uniform and dense three-dimensional network structure which has a high anti-deformation capability, forming protection for the active material layer, effectively reducing an interface reaction between a negative electrode and an electrolyte solution during a cycle, and making it possible to alleviate an impact of a volume change of the negative electrode active material during the cycle of a battery. The passivation layer in the negative electrode sheet provided by the present application can be used as artificial SEI to suppress the generation and growth of a lithium dendrite, thereby effectively improving cycle performance of the battery.

In some embodiments, a general molecular formula of the carboxymethyl cellulose is $[C_6H_7O_2(OH)_{3-x1}(OCH_2COOH)_{x1}]_{n1}$, where n1 is a degree of polymerization, and x1 is 0.4-0.7, optionally 0.5-0.7; and/or

- a general molecular formula of the metal salt of carboxymethyl cellulose is $[C_6H_7O_2(OH)_{3-x2}(OCH_2COOM)_{x2}]_{n2}$, where M includes one or more of lithium, sodium, potassium, rubidium, and cesium, and optionally, M includes lithium; n2 is a degree of polymerization; and x2 is 0.4-0.7, optionally 0.5-0.7.

In some embodiments, a Young's modulus of the ion resin is greater than or equal to 2.5 Gpa, optionally 18-27 Gpa.

In some embodiments, a weight-average molecular weight of the ion resin is 50000-300000 Da, optionally 70000-250000 Da.

In some embodiments, a thickness of the passivation layer is 1-8 μm, optionally 2-4 μm.

In some embodiments, the passivation layer is provided on the circumference of the active material layer to form a hollow closed structure.

Optionally, an area of a hollow region accounts for 10-30% of an area of the active material layer.

In some embodiments, the negative electrode active material includes at least one of graphite, soft carbon, hard carbon, a silicon-based material, a tin-based material, and lithium titanate, and optionally is graphite.

According to a second aspect of the present application, there is provided a preparation method for the negative electrode sheet, including the following steps:

- forming an active material layer on a negative electrode current collector, where the active material layer includes a negative electrode active material; and
- forming a passivation layer on the active material layer, where the passivation layer includes ion resin, and the ion resin includes one or more of carboxymethyl cellulose and a metal salt of carboxymethyl cellulose.

In some embodiments, the passivation layer is formed using a physical vapor deposition method, optionally an evaporation method or a sputtering method, and further optionally a vacuum evaporating method.

In some embodiments, before the forming a passivation layer on the active material layer, the method further includes:

- providing a mask plate so that the mask plate shields a middle portion of the active material layer to be treated, where an area of the mask plate is less than an area of the active material layer.

Optionally, the area of the mask plate is 10-30% of the area of the active material layer.

According to a third aspect of the present application, there is provided a secondary battery, including the negative electrode sheet according to the first aspect of the present application.

According to a fourth aspect of the present application, there is provided an electric device, including the secondary battery according to the third aspect of the present application.

Details of one or a plurality of embodiments of the present application are set forth in the drawings and the description below. Other features, objectives, and advantages of the present application will be apparent from the specification, and the drawings, and the claims.

DESCRIPTION OF DRAWINGS

To better describe and illustrate embodiments and/or examples provided in the present application, reference may be made to one or a plurality of drawings. Additional details or examples used to describe the drawings should not be considered as limiting the scope of any of the disclosed application, the currently described embodiments or examples, and optimal modes of these applications as currently understood. Moreover, the same reference numerals are used to denote the same components throughout the drawings. In the drawings.

DESCRIPTION OF REFERENCE NUMERALS

Figure 1:
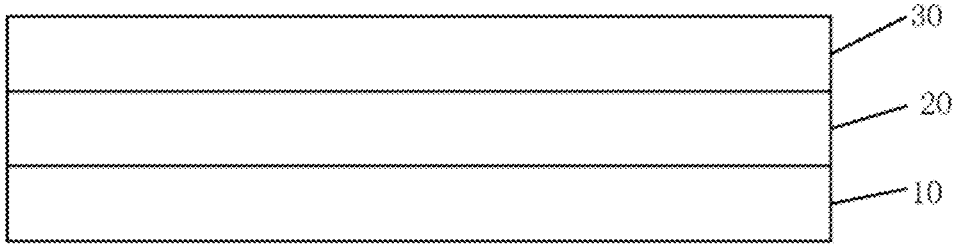
FIG. 1 is a schematic structural diagram of a negative electrode sheet according to an implementation of the present application.

1—secondary battery; 11—housing; 12—electrode assembly; 13—cover plate; and 2—electric device; 10—negative electrode current collector; 20—active material layer; 30—passivation layer

DESCRIPTION OF EMBODIMENTS

The following describes in detail some implementations of a negative electrode sheet and a preparation method therefor, a secondary battery, and an electric device of the present application with appropriate reference to the drawings. However, an unnecessary detailed description may be omitted. For example, a detailed description of well-known matters and repeated descriptions of a substantially same structure may be omitted. This is to prevent the following descriptions from becoming unnecessarily redundant and to facilitate understanding by those skilled in the art. In addition, the drawings and the following descriptions are provided to enable those skilled in the art to fully understand the present application, and are not intended to limit the subject matter recited in the claims.

A "range" disclosed in the present application may be defined using a lower limit and an upper limit. A given range is defined by selecting a lower limit and an upper limit, and the selected lower limit and upper limit define boundaries of the specific range. A range defined in such a manner may include an end value or may not include an end value, any end value may be independently included or not included, and a range may be any combination, that is, any lower limit may be combined with any upper limit to form a range. For example, if the ranges of 60-120 and 80-110 are listed for a specific parameter, it is understood that the ranges of 60-110 and 80-120 are also expectable. In addition, if minimum values 1 and 2 of a range are listed and maximum values 3, 4 and 5 of the range are listed, all the following ranges are expectable: 1-3, 1-4, 1-5, 2-3, 2-4, and 2-5. In the present application, unless otherwise stated, a numerical range "a-b" represents a shorthand representation for a combination of any real numbers between a and b, where both a and b are real numbers. For example, the numerical range of "0-5" represents that all real numbers between "0-5" have been listed herein, and "0-5" is only a shortened representation of these numerical combinations. In addition, when a parameter is expressed as an integer >2, it is equivalent to disclosing that the parameter is an integer such as 2, 3, 4, 5, 6, 7, 8, 9, 10, 11, or 12. For example, when a parameter is expressed as an integer sleeted from "2-10", it is equivalent to listing integers 2, 3, 4, 5, 6, 7, 8, 9, and 10.

Unless otherwise defined, "a plurality of", "various", and the like related in the present application refer to a number greater than or equal to 2. For example, "one or more" means one or greater than or equal to two.

Unless otherwise specified, all implementations and optional implementations of the present application may be combined with each other to form a new technical solution.

The "embodiment" mentioned herein means that a particular feature, structure, or characteristic described with reference to the embodiment may be included in at least one embodiment or implementation of the present application. The phrase in various places in the description does not necessarily refer to the same embodiment, or a separate or alternative embodiment mutually exclusive of other embodiments. It is explicitly and implicitly understood by those skilled in the art that the embodiment described herein may be combined with other embodiments. The "implementation" mentioned herein has a similar understanding.

Those skilled in the art may understand that, in the method of each implementation or embodiment, a writing order of each step does not mean a strict execution order that constitutes any limitation on an implementation process, and a detailed execution order of each step should be determined by its function and possible internal logic. Unless otherwise specified, all steps in the present application may be performed sequentially or randomly. For example, the method includes steps (a) and (b), which indicates that the method may include sequentially performed steps (a) and (b) or may include sequentially performed steps (b) and (a). For example, the mentioned method may further include step (c), which indicates that step (c) may be added to the method in any order, for example, the method may include steps (a), (b), and (c), may include steps (a), (c), and (b), may include steps (c), (a) and (b), or the like.

In the present application, in open technical features or technical solutions described by the words such as "contain", "include", and "comprise", unless otherwise specified, additional members other than the listed members are not excluded, and it may be considered that both closed features or solutions composed of the listed members and open features or solutions further including additional members in addition to the listed members are provided. For example, A includes a1, a2, and a3, and may further include another member or may not include an additional member unless otherwise specified, and it may be considered that both a feature or solution in which "A includes a1, a2, and a3" and a feature or solution in which "A includes not only a1, a2, and a3 but also another member" are provided.

In the present application, unless otherwise specified, A (e.g., B) means that B is a non-limiting example of A, and it may be understood that A is not limited to B. In this disclosure, unless otherwise specified, phrases like "at least one of A, B, and C" and "at least one of A, B, or C" both mean only A, only B, only C, or any combination of A, B, and C.

In the present application, "optionally", "optional", or "option" means presence or absence, that is, it means any one of two parallel solutions "presence" and "absence". If "option" occurs repeatedly in a technical solution, each "option" is independent, unless otherwise specified without inconsistency or mutual restriction.

The term "ion resin" refers to any resin that carries a charge, including ion resin that carries a negative charge and ion resin that carries a positive charge.

Currently, an important problem of a lithium-ion battery under long-term cycling and storage conditions is a lithium dendrite. The lithium dendrite caused by non-uniform deposition of lithium ions on the surface of a negative electrode affects the stability of an interface between a graphite negative electrode and an electrolyte solution. As the number of cycles increases continuously, the growth of the lithium dendrite continuously consumes the electrolyte solution and causes irreversible deposition of active lithium, thereby producing more dead lithium which causes a decrease of the coulombic efficiency of the battery. Meanwhile, the continuous growth of the lithium dendrite causes a great safety risk to the battery, which is mainly due to the lithium dendrite piercing through a separator. In the related art, an inorganic salt is often used as a negative electrode additive to construct an artificial SEI film, so as to improve the cycle performance of the battery. However, when the inorganic salt is used as an additive, the effect of improving the growth of the lithium dendrite is non-ideal.

Negative Electrode Sheet

In order to solve the above technical problem, referring to FIG. 1, according to a first aspect of the present application, there is provided a negative electrode sheet, including a negative electrode current collector 10 and a negative electrode film layer provided on at least one surface of the negative electrode current collector 10. The negative electrode film layer includes an active material layer 20 and a passivation layer 30, where the active material layer 20 is provided between the negative electrode current collector 10 and the passivation layer 30. The active material layer 20 includes a negative electrode active material, the passivation layer 30 includes ion resin, and the ion resin includes one or more of carboxymethyl cellulose and a metal salt of carboxymethyl cellulose. It should be noted that the negative electrode current collector 10 has two surfaces opposite to each other in a thickness direction thereof, and the negative electrode film layer is provided on either one or both of the two opposite surfaces of the negative electrode current collector 10.

The negative electrode sheet provided in the implementations of the present application includes the active material layer 20 and the passivation layer 30, where the passivation layer 30 includes the ion resin, and cations exchangeable with lithium ions are present in the ion resin, thereby effectively driving rapid migration and uniform distribution of the lithium ions. Moreover, the ion resin further includes a large number of hydrogen bonds cross-linkable into a uniform and dense three-dimensional network structure which has a high anti-deformation capability, forming protection for the active material layer 20, effectively reducing an interface reaction between the negative electrode and the electrolyte solution during a cycle, and making it possible to alleviate an impact of a volume change of the negative electrode active material during the cycle of a battery. The passivation layer 30 in the negative electrode sheet provided in the implementations of the present application can be used as artificial SEI to suppress the generation and growth of a lithium dendrite, thereby effectively improving cycle performance of the battery.

Carboxymethyl cellulose and salts thereof are each cellulose ether in which a part of hydroxyl groups on an anhydroglucose ring in cellulose are substituted with carboxymethyl groups.

In some implementations, a general molecular formula of the carboxymethyl cellulose is $[C_6H_7O_2(OH)_{3-x1}(OCH_2COOH)_{x1}]_{n1}$, where n1 is a degree of polymerization, and x1 is 0.4-0.7, optionally 0.5-0.7. x1 represents a "degree of substitution" and may be defined as an average number of hydroxyl groups substituted with carboxymethyl groups in each glucose unit of the cellulose.

In the above "x1 is 0.4-0.7", the value of x1 includes a minimum value and a maximum value of the range and each value between the minimum value and the maximum value, for example, includes, but is not limited to, point values in the embodiments and the following point values: 0.42, 0.44, 0.46, 0.48, 0.5, 0.52, 0.54, 0.56, 0.58, 0.6, 0.62, 0.64, 0.66, and 0.68; or a range between any two of the above point values.

In some implementations, a general molecular formula of the metal salt of carboxymethyl cellulose is $[C_6H_7O_2(OH)_{3-x2}(OCH_2COOM)_{x2}]_{n2}$, where M includes one or more of lithium, sodium, potassium, rubidium, and cesium, for example, M includes lithium; n2 is a degree of polymerization; and x2 is 0.4-0.7, for example, 0.5-0.7. x2 represents a "degree of substitution" and may be defined as an average number of hydroxyl groups substituted with carboxymethyl metal groups in each glucose unit of the cellulose.

In the above "x2 is 0.4-0.7", the value of x2 includes a minimum value and a maximum value of the range and each value between the minimum value and the maximum value, for example, includes, but is not limited to, point values in the embodiments and the following point values: 0.42, 0.44, 0.46, 0.48, 0.5, 0.52, 0.54, 0.56, 0.58, 0.6, 0.62, 0.64, 0.66, and 0.68; or a range between any two of the above point values.

It may be understood that n1 and n2 may be the same or different, and x1 and x2 may be the same or different.

The values of x1 and x2 affect film forming quality of the passivation layer 30. The higher the values of x1 and x2, the fewer hydrogen bonds and the lower viscosity between molecules in the ion resin, which is disadvantageous to cross-linking between the molecules, making the formed passivation layer 30 have a poor density, resulting in poor coating of the active material layer 20.

x1 and x2 may be measured using an instrument and a method known in the art, for example, measured using an ashing method, which may refer to the following method: 0.2000 grams (g) (corrected to 0.1 milligrams (mg)) of sample to be tested was weighed and placed in a 30 mL porcelain crucible, and after being ashed, the sample was placed into a muffle furnace, burned at 700° C. for 1 hour, cooled, and then taken out; a remainder in the porcelain crucible was completely transferred into a 150 mL Erlenmeyer flask with distilled water, 3-4 drops of methyl orange indicator solution were added dropwise into the Erlenmeyer flask, and titration was performed with a sulfuric acid standard solution. When the solution was red, 10 mL of sulfuric acid standard solution was further added dropwise, a total volume of the used sulfuric acid standard solution was recorded, then the solution was heated to boiling, and titrated with a sodium hydroxide standard solution after 10 min, until the color of the solution turned from red to yellow, and the volume of the used sodium hydroxide standard solution was recorded. A formula for the degree of substitution is as follows:

$$DS = \frac{0.162B}{1 - 0.08B}$$

$$B = \frac{2M_{H_2SO_4}V_{H_2SO_4} - M_{NaOH}V_{NaOH}}{m}$$

In the formula, DS is the degree of substitution; $M_{H2SO4}$ is a molar concentration of the sulfuric acid standard solution in mol/L; $M_{NaOH}$ is a molar concentration of the sodium hydroxide standard solution in mol/L; $V_{H2SO4}$ is the total volume of the sulfuric acid standard solution used for titration in mL; $V_{NaOH}$ is the total volume of the used sodium hydroxide standard solution in mL; and m is a mass of the sample to be tested in g.

In some implementations, a Young's modulus of the ion resin is greater than or equal to 2.5 Gpa, for example, 18-27 Gpa. When the Young's modulus of the ion resin is within the above range, the passivation layer 30 may have a higher anti-deformation capability, thereby further improving the cycle performance of the battery. The larger the Young's modulus, the stronger a capability of blocking the lithium dendrite during cycling, thereby improve the cycling. However, the Young's modulus should not be too large.

The value of the Young's modulus includes a minimum value and a maximum value of the above range and each value between the minimum value and the maximum value, for example, includes, but is not limited to, point values in the embodiments and the following point values: 10 GPa, 11 GPa, 12 GPa, 13 GPa, 14 GPa, 15 GPa, 16 GPa, 17 GPa, 18 GPa, 19 GPa, 20 GPa, 21 GPa, 22 GPa, 23 GPa, 24 GPa, 25 GPa, and 26 GPa.

The Young's modulus of the ion resin has a meaning well known in the art, and may be measured using an instrument and a method well known in the art, for example, using an AFM force-displacement curve measurement method, where an NSG-10 monocrystalline silicon probe is used, with a curvature radius of a probe tip being about 10 nm and an elastic coefficient (Kc) ranging from 3.1 N/m to 37.6 N/m, and a Kc value of the probe is determined using a thermal modulation method before measurement. A two-dimensional morphology of the sample was measured in a PeakForce Tapping™ mode of an ICON AFM, and a force-displacement curve (force curve for short) of the sample was recorded (with a rate of 2 μm/s). All tests were performed under conditions of 25° C. and 40% relative humidity. Data of the effective force curve was analyzed and fitted using NanoScope Analysis software, and the Young's modulus of compression of the sample was calculated according to an elastomechanical contact model.

In some implementations, a weight-average molecular weight of the ion resin is 50000-300000 Da, for example, 70000-250000 Da. When the weight-average molecular weight is within the above range, the film forming performance is better. A too large or too small weight-average molecular weight is disadvantageous to film formation.

The value of the above "50000-300000 Da" includes a minimum value and a maximum value of the range and each value between the minimum value and the maximum value, for example, includes, but is not limited to, point values in the embodiments and the following point values: 60000 Da, 70000 Da, 80000 Da, 90000 Da, 100000 Da, 110000 Da, 120000 Da, 130000 Da, 140000 Da, 150000 Da, 160000 Da, 170000 Da, 180000 Da, 190000 Da, 200000 Da, 210000 Da, 220000 Da, 230000 Da, 240000 Da, 250000 Da, 260000 Da, 270000 Da, 280000 Da, and 290000 Da; or a range between any two of the above point values.

The weight-average molecular weight of the ion resin has a meaning well known in the art, and may be measured using an instrument and a method well known in the art. For example, the viscosity of an aqueous solution of the ion resin may be measured according to ASTM D 1439-03, and the molecular weight may be estimated based on the viscosity of the standard aqueous solution of the resin. According to a method, the molecular weight of the ion resin may be estimated based on the viscosity using the following formula:

η [Pa S]=$8.91\times10^{-4}+1.30\times10^{-5}cMw^{0.9}+5.33\times10^{-8}c^2M_w^{1.8}+4.60\times10^{-15}c^{4.34}M_w^{3.91}$, where f is the viscosity, c is a concentration of CMC, and Mw is the molecular weight, as described by Kulicke in Polymer, Vol. 37, No. 13, pp. 2723-2731, 1996.

The carboxymethyl cellulose or metal salt of carboxymethyl cellulose in the present application may be commercially available or prepared by a method known in the art. In some implementations, metal salts of carboxymethyl cellulose other than sodium carboxymethyl cellulose may be prepared by the following method:

performing acid treatment on sodium carboxymethyl cellulose to obtain carboxymethyl cellulose; and adding an MOH solution to the obtained carboxymethyl cellulose, and heating the mixture.

It should be noted that the amount of the MOH solution is excessive relative to the amount of carboxymethyl groups in the carboxymethyl cellulose, so as to ensure that all carboxyl hydrogen in the carboxymethyl groups is replaced with M. M may be one or more of lithium, sodium, potassium, rubidium, and cesium.

In some implementations, a thickness of the passivation layer 30 is 1-8 micrometers (μm), and it may be understood the thickness of the passivation layer may include, but is not limited to, 1.5 μm, 2 μm, 2.5 μm, 3 μm, 3.5 μm, 4 μm, 4.5 μm, 5 μm, 5.5 μm, 6 μm, 6.5 μm, 7 μm, and 7.5 μm. Further, the thickness is, for example, 2-4 μm. When the thickness of the passivation layer is within the above range, a film forming effect and the interface dynamics performance are better. The passivation layer 30 with a too small thickness has a poor coating effect on the active material layer 20, and the passivation layer 30 with a too large thickness may degrade the performance of Li+ interface transport.

In some implementations, a thickness of the active material layer 20 is greater than 40 μm, for example, 40-79 μm, and it may be understood the thickness of the active material layer 20 may include, but is not limited to, 45 μm, 50 μm, 55 μm, 60 μm, 65 μm, 70 μm, and 75 μm.

A thickness of the negative electrode film layer is 40-80 μm.

The thicknesses of the passivation layer 30, the active material layer 20, and the negative electrode film layer may be measured with a micrometer, for example, measured with a micrometer of the model Mitutoyo293-100 and with the precision of 0.1 μm. It should be noted that the thicknesses of the passivation layer 30, the active material layer 20, and the negative electrode film layer in the present application refer to thicknesses of the passivation layer 30, the active material layer 20, and the negative electrode film layer in a positive electrode sheet used for assembling a battery after cold pressing and compaction.

The negative electrode active material in the present application is not particularly limited, and may include, but is not limited to, at least one of graphite, hard carbon, soft carbon, a silicon-based material, a tin-based material, and lithium titanate. The graphite may include at least one of natural graphite and artificial graphite. The silicon-based material may include, for example, at least one of elemental silicon, a silicon-oxygen compound, a silicon-carbon composite, a silicon-nitrogen composite, and a silicon alloy. The tin-based material may include, for example, at least one of elemental tin, a tin-oxygen compound, and a tin alloy. However, the present application is not limited to these materials, and another conventional material that can be used as a negative electrode active material of a battery may also be used. These negative electrode active materials may be used alone or in combination of two or more thereof.

A weight ratio of the negative electrode active material in the active material layer 20 is 70-100 wt % based on a total weight of the active material layer.

In some implementations, the active material layer 20 further includes a binder. The binder may include, for example, at least one of styrene-butadiene rubber (SBR), polyacrylic acid (PAA), sodium polyacrylate (PAAS), polyacrylamide (PAM), polyvinyl alcohol (PVA), sodium alginate (SA), polymethacrylic acid (PMAA), and carboxymethyl chitosan (CMCS). A weight ratio of the binder in the active material layer is 0-30 wt % based on the total weight of the active material layer.

In some implementations, the active material layer 20 further includes a conductive agent. The conductive agent may include, for example, at least one of superconducting carbon, carbon black (such as acetylene black or ketjen black), carbon dot, carbon nanotube, graphene, and carbon nanofiber. A weight ratio of the conductive agent in the active material layer is 0-20 wt % based on the total weight of the active material layer.

In some implementations, the active material layer 20 further includes other additives, such as a thickening agent (e.g., sodium carboxymethyl cellulose (CMC-Na)). A weight ratio of the other additives in the active material layer is 0-15 wt % based on the total weight of the active material layer.

In some implementations, the passivation layer 30 is provided on the circumference of the active material layer 20 to form a hollow closed structure.

During the cycling of the battery, due to non-uniform temperature and expansion force, a polarization distribution of the negative electrode sheet is non-uniform, where a middle part has a high temperature (due to the impact of heat dissipation) and a small expansion force and thus is subjected to low polarization, and a head part and a bottom part have low temperatures and large expansion forces and thus are subjected to high polarization. The non-uniform polarization easily causes lithium plating. Providing the passivation layer 30 on the circumference of the active material layer 20 to form the hollow closed structure can effectively solve the problem of lithium plating.

In some implementations, an area of a hollow region accounts for 10-30% of an area of the active material layer 20, including, but not limited to, 15%, 20%, 22%, 24%, 26%, 28%, and 30%. Further, the area of the hollow region accounts for 10-20% of the area of the active material layer 20.

According to a second aspect of the present application, there is provided a preparation method for the negative electrode sheet, including the following steps:

S10: forming an active material layer 20 on a negative electrode current collector 10, where the active material layer 20 includes a negative electrode active material; and S30: forming a passivation layer 30 on the active material layer 20, where the passivation layer 30 includes ion resin, and the ion resin includes one or more of carboxymethyl cellulose and a metal salt of carboxymethyl cellulose.

In some implementations, the passivation layer 30 is formed using a physical vapor deposition method.

The physical vapor deposition method includes at least one of an evaporation method and a sputtering method. The evaporation method includes, but is not limited to, at least one of a vacuum evaporating method, a thermal evaporation method, and an electron beam evaporation method (EBEM). The sputtering method includes, but is not limited to, magnetron sputtering.

In some implementations, the passivation layer 30 is formed using the vacuum evaporating method. In some implementations, a deposition rate of the vacuum evaporating method is 0.05-0.2 μ/min, further, for example, 0.07-0.15 μ/min. The deposition rate affects a film forming effect of the passivation layer, where a low deposition rate causes a deposited film to be loose and easily form large particles, affecting the density of the passivation layer. However, an excessively high deposition rate increases internal stress of the film, resulting in an increase of defects in the film layer, and in severe cases, causing the film layer to break.

In some implementations, before the forming a passivation layer 30 on the active material layer 20, the method further includes step S20:

S20: providing a mask plate so that the mask plate shields a middle portion of the active material layer 20 to be treated, where an area of the mask plate is less than an area of the active material layer 20.

It should be noted that the above-described middle portion is intended to form the hollow region, and is not limited to a strictly middle portion, as long as the circumferential edge of the active material layer 20 can be exposed.

In some implementations, the area of the mask plate is 10-30% of the area of the active material layer 20.

According to a third aspect of the present application, there is further provided a secondary battery, including the negative electrode sheet according to the first aspect of the present application.

Therefore, the obtained secondary battery has good cycle performance.

The following appropriately describes the secondary battery and the electric device in the present application with reference to the drawings.

In an implementation of the present application, a secondary battery is provided.

Generally, the secondary battery includes a positive electrode sheet, a negative electrode sheet, an electrolyte, and a separator. During charge and discharge of the battery, active ions are intercalated and deintercalated back and forth between the positive electrode sheet and the negative electrode sheet. The electrolyte functions to transfer ions between the positive electrode sheet and the negative electrode sheet. The separator is provided between the positive electrode sheet and the negative electrode sheet, and functions mainly to prevent positive and negative electrodes from being short-circuited and allow ions to pass through.

Positive Electrode Sheet

The positive electrode sheet includes a positive current collector and a positive electrode film layer provided on at least one surface of the positive current collector, where the positive electrode film layer includes a positive electrode active material.

As a non-limiting example, the positive electrode current collector has two surfaces opposite to each other in a thickness direction, and the positive electrode film layer is provided on either one or both of the two opposite surfaces of the positive electrode current collector.

In some implementations, the positive electrode current collector may be metal foil or a composite current collector. For example, aluminum foil may be used as the metal foil. The composite current collector may include a polymer material base layer and a metal layer formed on at least one surface of the polymer material base layer. The composite current collector may be obtained by forming a metal material on a polymer material substrate. The metal material may include, but is not limited to, aluminum, an aluminum alloy, nickel, a nickel alloy, titanium, a titanium alloy, silver, a silver alloy, and the like. The polymer material substrate may include, but is not limited to, one or more of substrates such as polypropylene (PP), polyethylene terephthalate (PET), polybutylene terephthalate (PBT), polystyrene (PS), and polyethylene (PE).

In some implementations, the positive electrode active material may include a positive electrode active material used for a battery that is well known in the art. As a non-limiting example, the positive electrode active material may include one or more of the following materials: olivine-structured lithium-containing phosphate, a lithium transition metal oxide, and their respective modified compounds. However, the present application is not limited to these materials, and other conventional materials that can be used as positive electrode active materials of a battery may also be used. These positive electrode active materials may be used alone or in combination of two or more thereof. An example of the lithium transition metal oxide may include, but is not limited to, one or more of a lithium cobalt oxide, a lithium nickel oxide, a lithium manganese oxide, a lithium nickel cobalt oxide, a lithium manganese cobalt oxide, a lithium nickel manganese oxide, a lithium nickel cobalt manganese oxide, a lithium nickel cobalt aluminum oxide, modified compounds thereof, and the like. A non-limiting example of the olivine-structured lithium-containing phosphate may include, but is not limited to, one or more of lithium iron phosphate (e.g., $LiFePO_4$ (which may also be referred to as LFP for short)), a composite material of lithium iron phosphate and carbon, lithium manganese phosphate (e.g., $LiMnPO_4$), a composite material of lithium manganese phosphate and carbon, lithium ferro-manganese phosphate, and a composite material of lithium ferro-manganese phosphate and carbon. A non-limiting example of the lithium cobalt oxide may include $LiCoO_2$. A non-limiting example of the lithium nickel oxide may include $LiNiO_2$. A non-limiting example of the lithium manganese oxide may include $LiMnO_2$, $LiMn_2O_4$, and the like. A non-limiting example of the lithium nickel cobalt manganese oxide may include $LiNi_{1/3}Co_{1/3}Mn_{1/3}O_2$ (which may be referred to as $NCM_{333}$ for short), $LiNi_{0.5}Co_{0.2}Mn_{0.3}O_2$ (which may be referred to as $NCM_{523}$ for short), $LiNi_{0.5}Co_{0.25}Mn_{0.25}O_2$ (which may be referred to as $NCM_{211}$ for short), $LiNi_{0.6}Co_{0.2}Mn_{0.2}O_2$ (which may be referred to as $NCM_{622}$ for short), $LiNi_{0.8}Co_{0.1}Mn_{0.1}O_2$ (which may be referred to as $NCM_{811}$ for short), and the like. A non-limiting example of the lithium nickel cobalt aluminum oxide may include $LiNi_{0.8}Co_{0.15}Al_{0.05}O_2$.

A weight ratio of the positive electrode active material in the positive electrode film layer is 80-100 wt % based on a total weight of the positive electrode film layer.

In some implementations, the positive electrode film layer further includes a binder. As a non-limiting example, the binder may include one or more of polyvinylidene fluoride (PVDF), polytetrafluoroethylene (PTFE), vinylidene fluoride-tetrafluoroethylene-propylene terpolymer, vinylidene fluoride-hexafluoropropylene-tetrafluoroethylene terpolymer, tetrafluoroethylene-hexafluoropropylene copolymer, and fluorine-containing acrylate resin. A weight ratio of the binder in the positive electrode film layer is 0-20 wt % based on the total weight of the positive electrode film layer.

In some implementations, the positive electrode film layer further includes a conductive agent. As a non-limiting example, the conductive agent may include one or more of superconducting carbon, acetylene black, carbon black, ketjen black, carbon dots, carbon nanotubes, graphene, and carbon nanofibers. A weight ratio of the conductive agent in the positive electrode film layer is 0-20 wt % based on the total weight of the positive electrode film layer.

In some implementations, the positive electrode sheet may be prepared in the following manner: dispersing the above-described components used for preparing the positive electrode sheet, such as the positive electrode active material, the conductive agent, and the binder, and any other components into a solvent to form a positive electrode paste, applying the positive electrode paste to at least one side surface of the positive electrode current collector, and performing processes such as drying and cold pressing, so as to obtain the positive electrode sheet. The cold pressing may be performed using a cold rolling mill. The type of the solvent may be selected from, but is not limited to, any one of those described in the above implementations, for example, N-methylpyrrolidone (NMP). The positive electrode paste may be applied to a single surface of the positive electrode current collector or two surfaces of the positive electrode current collector. A solid content of the positive electrode paste may be 40-80 wt %. The viscosity of the positive electrode paste at room temperature may be adjusted to 5000-25000 mPa·s. During application of the positive electrode paste, a surface density per application unit based on a dry weight (excluding the solvent) may be 2-2.7 mg/cm$^2$, for example, 2.2-2.4 g/cm$^3$. A thickness of the positive electrode film layer is 51-191 μm.

The thickness T of the positive electrode film layer may be measured with a micrometer, for example, measured with a micrometer of the model Mitutoyo293-100 and with the precision of 0.1 μm. It should be noted that the thickness of the positive electrode film layer in the present application refers to a thickness of the positive electrode film layer in the positive electrode sheet used for assembling a battery after cold pressing and compaction.

Negative Electrode Sheet

The positive electrode sheet is the positive electrode sheet provided according to the first aspect of the present application.

Electrolyte

The electrolyte functions to transfer ions between the positive electrode sheet and the negative electrode sheet. The type of the electrolyte is not particularly limited in the present application, and may be selected according to a demand. For example, the electrolyte may be liquid, gelled or all solid.

In some implementations, the electrolyte is an electrolyte solution. The electrolyte solution includes an electrolyte salt and a solvent.

In some implementations, the electrolyte salt of a lithium ion battery may include one or more of lithium hexafluorophosphate ($LiPF_6$), lithium tetrafluoroborate ($LiBF_4$), lithium perchlorate ($LiClO_4$), lithium hexafluoroarsenate ($LiAsF_6$), lithium bis(fluorosulfonyl)imide (LiFSI), lithium bis-trifluoromethanesulfonimide (LiTFSI), lithium trifluoromethanesulfonate (LiTFS), lithium difluoro(oxalato)borate (LiDFOB), lithium dioxalate borate (LiBOB), lithium difluorophosphate ($LiPO_2F_2$), lithium difluorodioxalate phosphate (LiDFOP), and lithium tetrafluorooxalate phosphate (LiTFOP). A concentration of the electrolyte salt is usually 0.5-5 mol/L.

In some implementations, the solvent may include one or more of fluoroethylene carbonate (FEC), ethylene carbonate (EC, 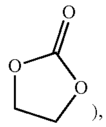 ), propylene carbonate (PC, 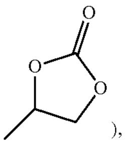 ), ethyl methyl carbonate (EMC), diethyl carbonate (DEC), dimethyl carbonate (DMC), dipropyl carbonate (DPC), methyl propyl carbonate (MPC), ethyl propyl carbonate (EPC), butylene carbonate (BC, 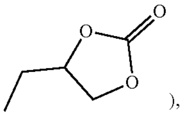 ), methyl formate (MF), methyl acetate (MA), ethyl acetate (EA), propyl acetate (PA), methyl propionate (MP), ethyl propionate (EP), propyl propionate (PP), methyl butyrate (MB), ethyl butyrate (EB), 1,4-butyrolactone (GBL), sulfolane (SF), methyl sulfonyl methane (MSM), ethyl methyl sulfone (EMS), and ethyl sulfonyl ethane (ESE).

In some implementations, the electrolyte solution further includes an additive. For example, the additive may include a negative electrode film-forming additive or a positive electrode film-forming additive, and may further include an additive capable of improving some performance of a battery, for example, an additive for improving overcharge performance of a battery, or an additive for improving high-temperature or low-temperature performance of a battery.

In some implementations, the additive in the electrolyte solution may include, but is not limited to, one or more of fluoroethylene carbonate (FEC), difluoroethylene carbonate (DFEC), trifluoromethyl ethylene carbonate (TFPC), or the like.

Separator

In some implementations, the secondary battery further includes a separator. The type of the separator is not particularly limited in the present application, and any well-known porous separator with good chemical stability and mechanical stability may be used.

In some implementations, a material of the separator may include one or more of glass fiber, non-woven fabric, polyethylene, polypropylene, and polyvinylidene fluoride. The separator may be a single-layer thin film or may be a multi-layer composite thin film, which is not particularly limited. When the separator is a multi-layer composite thin film, materials of all layers may be the same or different, which is not particularly limited.

In some implementations, a thickness of the separator is 5-30 μm, for example, 7-18 μm.

In some implementations, the air permeability of the separator may be 100-300 s/100 mL; for example, the air permeability of the separator may be 150-250 s/100 mL, which is tested according to the national standard GB/T 36363-2018.

A thickness of the separator may be measured with a micrometer, for example, measured with a micrometer of the model Mitutoyo293-100 and with the precision of 0.1 μm.

In some implementations, the positive electrode sheet, the negative electrode sheet, and the separator may be manufactured into an electrode assembly through a winding process or a lamination process.

In some implementations, the secondary battery may include an outer package. The outer package may be used to package the electrode assembly and the electrolyte.

In some implementations, the outer package of the secondary battery may be a hard case, such as a hard plastic case, an aluminum case, or a steel case. The outer package of the secondary battery may also be a pouch, such as a bag-type pouch. A material of the pouch may be plastic, and further, a non-limiting example of the plastic may include one or more of polypropylene, polybutylene terephthalate, and polybutylene succinate.

The secondary battery includes at least one battery cell. The secondary battery may include one or a plurality of battery cells.

In the present application, unless otherwise specified, the "battery cell" refers to a basic unit capable of implementing mutual conversion between chemical energy and electrical energy, and further, generally includes at least a positive electrode sheet, a negative electrode sheet, and an electrolyte. During charge and discharge of the battery, active ions are intercalated and deintercalated back and forth between the positive electrode sheet and the negative electrode sheet. The electrolyte functions to transfer active ions between the positive electrode sheet and the negative electrode sheet.

Figure 2:
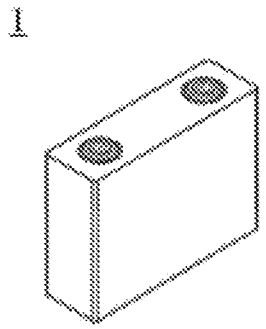
FIG. 2 is a schematic diagram of a secondary battery according to an implementation of the present application.

The shape of the battery cell is not particularly limited in the present application, and may be a cylindrical shape, a square shape, or any other shape. For example, FIG. 2 shows a secondary battery 1 of a square structure as an example.

Figure 3:
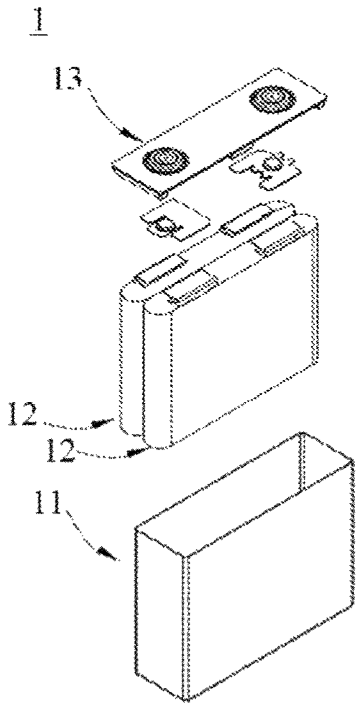
FIG. 3 is an exploded view of the secondary battery shown in FIG. 2 according to an implementation of the present application.

In some implementations, referring to FIG. 3, the outer package may include a housing 11 and a cover plate 13. The housing 11 may include a bottom plate and a side plate connected to the bottom plate, where the bottom plate and the side plate form an accommodating chamber by surrounding. The housing 11 has an opening communicating with the accommodating chamber, and the cover plate 13 can cover the opening to close the accommodating chamber. The positive electrode sheet, the negative electrode sheet, and the separator may be formed into an electrode assembly 12 through a winding process or a lamination process. The electrode assembly 12 is packaged within the accommodating chamber. The electrode assembly 12 is impregnated with the electrolyte solution. There may be one or a plurality of electrode assemblies 22 included in the secondary battery 1, and the number may be selected by those skilled in the art according to a practical need.

In some implementations, the secondary batteries 1 may be assembled into a battery module. There may be one or a plurality of secondary batteries 1 included in the battery module, and the number may be selected by those skilled in the art according to the application and capacity of the battery module.

In the battery module, a plurality of secondary batteries 1 may be arranged sequentially in a length direction of the battery module. Certainly, the secondary batteries may alternatively be arranged in any other manner. Further, the plurality of secondary batteries 1 may be fixed by fasteners.

In some implementations, the battery module may further include a housing with an accommodating space. The plurality of secondary batteries 1 are accommodated in the accommodating space.

In some implementations, the battery modules may be further assembled into a battery pack. There may be one or a plurality of battery modules included in the battery pack, and the specific number may be selected by those skilled in the art according to the application and capacity of the battery pack.

A battery case and a plurality of battery modules provided in the battery case may be included in the battery pack. The battery case includes an upper case and a lower case, where the upper case can cover the lower case and form a closed space for accommodating the battery modules. The plurality of battery modules may be arranged in the battery case in any manner.

In addition, the present application further provides an electric device including at least one of the secondary battery, the battery module, or the battery pack provided by the present application. The secondary battery, the battery module, or the battery pack may be used as a power source of the electric device and may also be used as an energy storage unit of the electric device. The electric device may include a mobile device (e.g., a mobile phone, a notebook computer, etc.), an electric vehicle (e.g., a pure electric vehicle, a hybrid electric vehicle, a plug-in hybrid electric vehicle, an electric bicycle, an electric scooter, an electric golf cart, an electric truck, etc.), an electric train, a ship, a satellite, an energy storage system, and the like, but is not limited thereto.

The secondary battery, the battery module, or the battery pack may be selected according to a use demand of the electric device.

Figure 4:
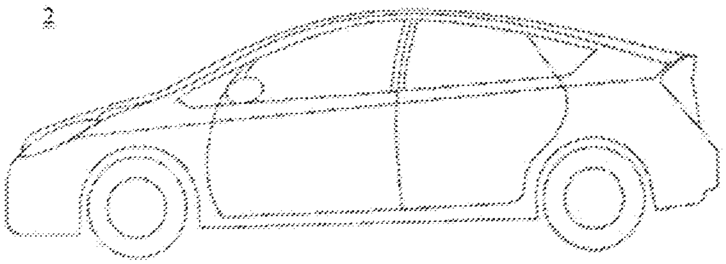
FIG. 4 is a schematic diagram of an electric device using the secondary battery as a power supply according to an implementation of the present application.

FIG. 4 shows an electric device as an example. The electric device is a pure electric vehicle, a hybrid electric vehicle, a plug-in hybrid electric vehicle, or the like. In order to meet the demand for high power and high energy density of the secondary battery of the electric device, a battery pack or a battery module may be used.

The device as another example may be a mobile phone, a tablet computer, a notebook computer, or the like. The device is generally required to be thin and lightweight, and may use a secondary battery as a power source.

EXAMPLES

In order to make the technical problems solved by the present application, the technical solutions, and the advantageous effects clearer, the present application will be further described in detail below with reference to the embodiments and the drawings. Apparently, the described examples are only a part of the examples of the present application, rather than all of the examples. The following description of at least one example is merely illustrative in nature and is in no way intended as any limitation on the present application and its applications. All other examples obtained by those skilled in the art based on the examples of the present application without making creative effort shall fall within the protection scope of the present application.

In the examples, specific techniques or conditions are not indicated, and they are performed according to techniques or conditions described in documents in the art or according to the specification of the product. The reagents or instruments used without specifying the manufacturer(s) are conventional products that are commercially available.

I. Preparation of the Metal Salt of Carboxymethyl Cellulose

Sodium carboxymethyl cellulose was dispersed in an ethanol/water mixture (with a volume ratio of 95:5), then a 20 wt % HCl solution was added, and the mixture was subjected to acid treatment at 35° C. for 2 hours, filtered, washed three times with an ethanol/water mixture (with a volume ratio of 85:15), and dried at 105° C. for 12 hours, so as to obtain carboxymethyl cellulose.

The carboxymethyl cellulose was dispersed in an ethanol/water mixture (with a volume ratio of 90:10), and then was added to a LiOH (7 wt %) aqueous solution, for a reaction at 50° C. for 2 hours. Then the solution was washed three times with an ethanol/water mixture (with a volume ratio of 85:15) and dried at 105° C. for 12 hours, so as to obtain lithium carboxymethyl cellulose.

The LiOH aqueous solution may be freely replaced with KOH, RbOH, CsOH, and Ca(OH)2 as needed, so as to obtain potassium carboxymethyl cellulose, rubidium carboxymethyl cellulose, cesium carboxymethyl cellulose, and calcium carboxymethyl cellulose for subsequent preparation of the negative electrode sheet. It should be noted that when the LiOH aqueous solution is replaced with other alkali aqueous solutions, the amount of alkali in the aqueous solution is excessive relative to the amount of carboxylic acid groups in the carboxymethyl cellulose.

II. Preparation of the Secondary Battery

Example 1

1. Preparation of a Positive Electrode Sheet

Lithium iron phosphate (with a gram volume of 139 mAh/g) used as a positive electrode active material, carbon black used as a conductive agent, and polyvinylidene fluoride (PVDF) used as a binder were mixed at a weight ratio of 94:4:2 and added into N-methylpyrrolidone (NMP) used as a solvent, and the mixture was sufficiently stirred and well mixed to obtain a positive electrode paste; then the positive electrode paste was uniformly applied to aluminum foil used as a positive electrode current collector, followed by drying, cold pressing, and cutting, so as to obtain the positive electrode sheet.

2. Preparation of a Negative Electrode Sheet

Artificial graphite (with a gram volume of 340 mAh/g) used as a negative electrode active material, acetylene black used as a conductive agent, styrene-butadiene rubber (SBR) used as a binder, and sodium carboxymethyl cellulose (CMC) used as a thickening agent were mixed at a weight ratio of 95:1.5:3.1:0.4 and added into deionized water used as a solvent, and the mixture was sufficiently stirred and well mixed to obtain an active material layer paste. The active material layer paste was applied to copper foil used as a negative electrode current collector and dried to form an active material layer, where an application weight of the negative electrode paste was 0.132 g/1540.25 mm2 (based on a weight excluding the solvent), and an application thickness was 80 μm.

The copper foil having the active material layer formed thereon was placed in a vacuum coating machine, dried carboxymethyl cellulose was placed in an evaporation boat, a chamber was vacuumized to 5×10-5 Torr, and the temperature was gradually increased to 110° C. to result in a film deposition rate of 0.15 μ/min, and carboxymethyl cellulose with a thickness of 5 μm was deposited on the active material layer to form a passivation layer.

3. Preparation of an Electrolyte Solution

Ethylene carbonate (EC) and diethyl carbonate (DEC) were mixed at a volume ratio of 3:7 to obtain an organic solvent; LiPF6 was dissolved in the organic solvent, then fluoroethylene carbonate (FEC) was added, and the mixture was mixed well to obtain an electrolyte solution, where a concentration of LiPF6 was 1 mol/L, and a mass percentage of fluoroethylene carbonate (FEC) was 2% based on a total mass of the electrolyte solution.

4. Preparation of a Separator

A PE porous thin film was used as a separator.

5. Preparation of a Lithium-Ion Secondary Battery

The positive electrode sheet, the separator, and the negative electrode sheet were stacked in order, where the separator was located between the positive and negative electrode sheets to play a separating role, the positive electrode sheet, the separator, and the negative electrode sheet were wound to obtain a bare cell, a tab was welded to the bare cell, the bare cell was packaged into an aluminum case and baked at 80° C. to remove water, and then the electrolyte solution was injected and the aluminum case was sealed to obtain an uncharged battery. The uncharged battery was further subjected to processes such as standing, hot and cold pressing, chemical forming, shaping, and testing, so as to obtain the lithium-ion secondary battery.

Examples 2-18

The preparation methods are substantially the same as that in Example 1, except that the negative electrode sheet material and parameters thereof are replaced with corresponding parameters in Example 1, as shown in Table 1.

Comparative Example 1

The preparation method is substantially the same as that in Example 1, except that the passivation layer in the negative electrode sheet is omitted.

Comparative Example 2

The preparation method is substantially the same as that in Example 1, except that the hydroxymethyl cellulose is replaced with sodium hydroxymethyl cellulose.

III. Performance Tests

1. Cycle Performance Test (1) Cycle Performance Test at a Room Temperature (25° C.)

At 25° C., a test battery was placed on a high temperature box for testing. The battery was charged to 3.65 V with a constant current at a rate of 1 C, after standing for 5 min, the battery was charged to a current of 0.05 C with a constant voltage of 3.65 V, and then allowed to stand for 30 min. After the charge was completed, the battery was discharged to 2.5 V with a constant current of 1 C, thus completing one charge-discharge cycle. According to this method, the battery was subjected to a cyclic charge-discharge test until a discharge capacity is attenuated to 80%, and then the number of cycles was recorded.

(2) Cycle Performance Test at a High Temperature (45° C.)

At 45° C., a test battery was placed on a high temperature box for testing. The battery was charged to 3.65 V with a constant current at a rate of 1 C, after standing for 5 min, the battery was charged to a current of 0.05 C with a constant voltage of 3.65 V, and then allowed to stand for 30 min. After the charge was completed, the battery was discharged to 2.5 V with a constant current of 1 C, thus completing one charge-discharge cycle. According to this method, the battery was subjected to a cyclic charge-discharge test until a discharge capacity is attenuated to 80%, and then the number of cycles was recorded.

(3) Cycle Performance Test at a High Temperature (60° C.)

At 60° C., a test battery was placed on a high temperature box for testing. The battery was charged to 3.65 V with a constant current at a rate of 1 C, after standing for 5 min, the battery was charged to a current of 0.05 C with a constant voltage of 3.65 V, and then allowed to stand for 30 min. After the charge was completed, the battery was discharged to 2.5 V with a constant current of 1 C, thus completing one charge-discharge cycle. According to this method, the battery was subjected to a cyclic charge-discharge test until a discharge capacity is attenuated to 80%, and then the number of cycles was recorded.

2. Lithium Dendrite

After each prepared secondary battery described above was subjected to 200 cycles according to the charge-discharge method described in the section "1. Cycle performance test", the secondary battery was disassembled in an argon atmosphere glove box (H2O<0.1 ppm, O2<0.1 ppm), and a surface morphology of the negative electrode sheet was observed by eyes to determine whether a lithium dendrite was generated. When there is no white spot on the negative electrode sheet, it is determined that there is no lithium dendrite; when there are few white spots on the negative electrode sheet, it is determined that there is a slight case of lithium dendrites; and when there are dense white spots on the negative electrode sheet, it is determined that there is a severe case of lithium dendrites.

Test results are shown in Table 1 below.

TABLE 1

| | Ion resin | Degree of substitution | Weight-average molecular weight Da | Young's modulus GPa |
|---|---|---|---|---|
| Example 1 | Carboxymethyl cellulose | 0.4 | 250000 | 26 |
| Example 2 | Lithium carboxymethyl cellulose | 0.4 | 250000 | 27 |
| Example 3 | Sodium carboxymethyl cellulose | 0.4 | 250000 | 2.5 |

TABLE 1-continued

| | | | | |
|---|---|---|---|---|
| Example 4 | Potassium carboxymethyl cellulose | 0.4 | 250000 | 6 |
| Example 5 | Rubidium carboxymethyl cellulose | 0.4 | 250000 | 5 |
| Example 6 | Cesium carboxymethyl cellulose | 0.4 | 250000 | 4 |
| Example 7 | Calcium carboxymethyl cellulose | 0.4 | 250000 | 5 |
| Example 8 | Lithium carboxymethyl cellulose | 0.6 | 250000 | 25 |
| Example 9 | Lithium carboxymethyl cellulose | 0.7 | 250000 | 18 |
| Example 10 | Lithium carboxymethyl cellulose | 0.8 | 250000 | 15 |
| Example 11 | Lithium carboxymethyl cellulose | 0.6 | 250000 | 25 |
| Example 12 | Lithium carboxymethyl cellulose | 0.6 | 250000 | 25 |
| Example 13 | Lithium carboxymethyl cellulose | 0.6 | 250000 | 25 |
| Example 14 | Lithium carboxymethyl cellulose | 0.6 | 250000 | 25 |
| Example 15 | Lithium carboxymethyl cellulose | 0.4 | 250000 | 27 |
| Example 16 | Lithium carboxymethyl cellulose | 0.4 | 250000 | 27 |
| Example 17 | Lithium carboxymethyl cellulose | 0.4 | 250000 | 27 |
| Example 18 | Lithium carboxymethyl cellulose | 0.4 | 250000 | 27 |
| Comparative Example 1 | / | / | / | / |
| Comparative Example 2 | Sodium hydroxymethylcellulose | / | 250000 | 1.25 |

| | Thickness (μm) of the passivation layer | Area (%) of the hollow region | Lithium dendrite | Number of cycles at a room temperature | Number of cycles at 45° C. | Number of cycles at 60° C. |
|---|---|---|---|---|---|---|
| Example 1 | 3 | 0 | Slight | 1601 | 1300 | 1085 |
| Example 2 | 3 | 0 | Slight | 2103 | 1678 | 1421 |
| Example 3 | 3 | 0 | Slight | 1832 | 1576 | 1321 |
| Example 4 | 3 | 0 | Slight | 1731 | 1507 | 1303 |
| Example 5 | 3 | 0 | Slight | 1687 | 1487 | 1276 |
| Example 6 | 3 | 0 | Slight | 1679 | 1476 | 1271 |
| Example 7 | 3 | 0 | Slight | 1612 | 1310 | 1090 |
| Example 8 | 3 | 0 | Slight | 2313 | 1901 | 1508 |
| Example 9 | 3 | 0 | Slight | 2208 | 1848 | 1467 |
| Example 10 | 3 | 0 | Slight | 1986 | 1678 | 1421 |
| Example 11 | 1 | 0 | Slight | 1902 | 1603 | 1236 |
| Example 12 | 2 | 0 | Slight | 2001 | 1667 | 1285 |
| Example 13 | 4 | 0 | Slight | 2287 | 1860 | 1430 |
| Example 14 | 8 | 0 | Slight | 1578 | 1242 | 1088 |
| Example 15 | 3 | 10 | Slight | 2183 | 1756 | 1508 |
| Example 16 | 3 | 20 | None | 2385 | 1902 | 1562 |
| Example 17 | 3 | 30 | None | 2089 | 1445 | 1187 |
| Example 18 | 3 | 35 | None | 1978 | 1342 | 1065 |
| Comparative Example 1 | / | / | Severe | 1510 | 1217 | 1013 |
| Comparative Example 2 | 3 | 0 | Severe | 1498 | 1208 | 1001 |

The above descriptions of the various embodiments tend to emphasize differences between the various embodiments. For same or similar parts thereof, reference may be made to these embodiments, which are no longer repeated herein for brevity.

It should be noted that the present application is not limited to the above-described implementations. The above-described implementations are merely examples, and any implementation having substantially the same configuration as the technical concept and exhibiting the same effect within the scope of the technical solutions of the present application is included in the technical scope of the present application. In addition, various modifications that can be conceived by those skilled in the art may be made to the implementations without departing from the subject matter of the present application, and other implementations constructed by combining some of the constituent elements in the implementations are also included in the scope of the present application.

What is claimed is:

1. A negative electrode sheet, comprising a negative electrode current collector, an active material layer, and a passivation layer;

wherein the active material layer is provided between the negative electrode current collector and the passivation layer; and wherein the active material layer comprises a negative electrode active material, the passivation layer comprises ion resin, and the ion resin comprises one or more of carboxymethyl cellulose and a metal salt of carboxymethyl cellulose, and a weight-average molecular weight of the ion resin is 70000-250000 Da.

2. The negative electrode sheet according to claim 1, wherein:

a general molecular formula of the carboxymethyl cellulose is $[C_6H_7O_2(OH)_{3-x1}(OCH_2COOH)_{x1}]n1$, wherein n1 is a degree of polymerization, and x1 is 0.4-0.7; and/or a general molecular formula of the metal salt of carboxymethyl cellulose is $[C_6H_7O_2(OH)_{3-x2}(OCH_2COOM)_{x2}]_{n2}$, wherein M comprises one or more of lithium, sodium, potassium, rubidium, and cesium; n2 is a degree of polymerization; and x2 is 0.4-0.7.

3. The negative electrode sheet according to claim 1, wherein a Young's modulus of the ion resin is greater than or equal to 2.5 Gpa.

4. The negative electrode sheet according to claim 1, wherein a thickness of the passivation layer is 1-8 μm.

5. The negative electrode sheet according to claim 1, wherein the passivation layer is provided on the circumference of the active material layer to form a hollow closed structure.

6. The negative electrode sheet according to claim 1, wherein the negative electrode active material comprises at least one of graphite, soft carbon, hard carbon, a silicon-based material, a tin-based material, and lithium titanate.

7. A preparation method for the negative electrode sheet according to claim 1, comprising:

forming an active material layer on a negative electrode current collector, wherein the active material layer comprises a negative electrode active material; and forming a passivation layer on the active material layer, wherein the passivation layer comprises ion resin, and the ion resin comprises one or more of carboxymethyl cellulose and a metal salt of carboxymethyl cellulose.

8. The preparation method according to claim 7, wherein the passivation layer is formed using a physical vapor deposition method.

9. The preparation method according to claim 8, further comprising, before the forming a passivation layer on the active material layer:

providing a mask plate so that the mask plate shields a middle portion of the active material layer to be treated, wherein an area of the mask plate is less than an area of the active material layer.

10. A secondary battery, comprising the negative electrode sheet according to claim 1.

11. An electric device, comprising the secondary battery according to claim 10.

12. The negative electrode sheet according to claim 2, wherein x1 is 0.5-0.7 and/or x2 is 0.5-0.7.

13. The negative electrode sheet according to claim 2, wherein M comprises lithium.

14. The negative electrode sheet according to claim 3, wherein the Young's modulus of the ion resin is 18-27 Gpa.

15. The negative electrode sheet according to claim 4, wherein the thickness of the passivation layer is 2-4 μm.

16. The negative electrode sheet according to claim 5, wherein an area of a hollow region accounts for 10-30% of an area of the active material layer.

17. The negative electrode sheet according to claim 6, wherein the negative electrode active material is graphite.

18. The preparation method according to claim 8, wherein the passivation layer is formed using an evaporation method or a sputtering method.

19. The preparation method according to claim 9, wherein the area of the mask plate is 10-30% of the area of the active material layer.

* * * * *